Figure 1:
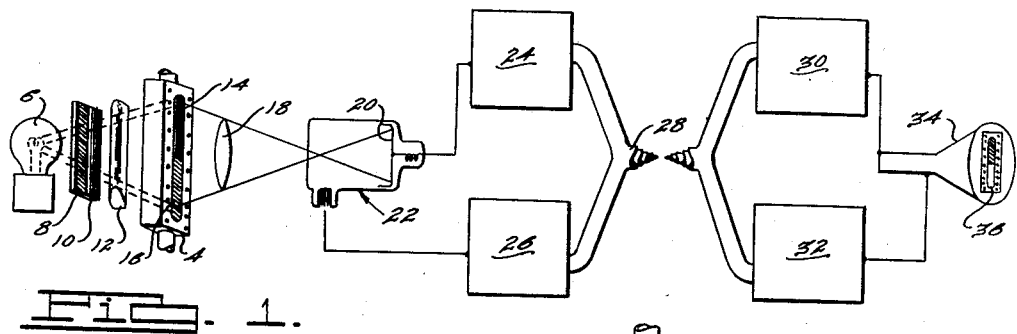

Oct. 30, 1951  J. A. GOOD  2,573,006

LIQUID LEVEL TELEGAUGE

Filed May 23, 1947

INVENTOR.
James A. Good.
BY
Harness, Dickey & Pierce
ATTORNEYS.

Patented Oct. 30, 1951

2,573,006

UNITED STATES PATENT OFFICE 2,573,006

LIQUID LEVEL TELEGAUGE

James A. Good, Grosse Pointe, Mich., assignor to Diamond Power Specialty Corporation, Detroit, Mich., a corporation of Michigan Application May 23, 1947, Serial No. 749,964

1 Claim. (Cl. 73—327)

This invention relates to telegauges, and although it has found its primary utility, up to the present time, in connection with the improvement of water gauges for steam boilers, it will be seen to be readily adaptable to other applications for showing the liquid level in receptacles of various types.

The main objects of this invention are to provide an improved liquid level gauge for various uses; to provide an improved water level gauge for steam boilers and the like; to provide a liquid level gauge which can be observed at a distant or remote location; to provide a remotely located liquid level gauge of such construction that it is impossible for the attendant to receive a false reading as to the liquid level; and to provide a steam boiler water level gauge which will furnish at a station remote from the boiler a brilliant image of a water column type of gauge located appurtenant to the boiler in the conventional manner.

An object related to that last stated is to provide such a liquid level telegauge which furnishes a liquid column image at the remote or observing station wherein the liquid and the space above the liquid, which may be occupied by steam or other vapor, are shown contractingly illuminated, or the liquid-containing area of the column may be unilluminated while the steam space or other space above the liquid may be represented as a brilliantly illuminated area, or reversely the liquid may be the illuminated section of the image at the observing station, as the engineer, designer or owner of the gauge may desire. In any event, however, with my improved gauge, the level is always brilliantly indicated, while if the column should, for example, become entirely filled with steam, it cannot be mistaken for a column filled with water. Such an error, which is easily made with gauges of other types, has in the past caused disastrous consequences upon numerous occasions, as is well known in the art.

An important commercial type of liquid level gauge which is adapted either for direct reading or reading from a remote point through the agency of mirrors or other simple optical transmitting means, is the so-called bi-color water gauge based upon Blackburn Patents Nos. 2,024,815 and 2,115,899. The Blackburn type of bi-color gauge constituted a very important contribution to the art and its characteristics will be considered in greater detail hereinafter, but it is to be noted here in connection with a general statement of the objects of the present invention, that when an attempt was made to transmit an image of the commercial bi-color water gauge by electronic television means to a point farther from the boiler than the image could be transmitted optically, it was found that although the television apparatus afforded a satisfactory picture of the gauge assembly at the receiving station, it was not possible to distinguish the red portions of the gauge corresponding to the steam-containing area, from the green portions of the gauge corresponding to the water-containing area. This difficulty was due to the fact that conventional television apparatus utilizing a camera tube of one of the more usual types, such as an iconoscope tube or a modified iconoscope tube (e. g. the orthiconoscope or "orthicon") does not have adequate color sensitivity to distinguish between the illuminated red and green areas of the Blackburn type bi-color water gauge above referred to.

It is an important object of the present invention, therefore, to provide an improved electronic telegauge wherein a commercial Blackburn type bi-color water gauge serves as the liquid level responsive element, an image showing the appearance of the sight glass being transmitted electronically to a remote point in such manner that the water-containing and steam-containing portions of the sight glass assembly are distinguished from one another in a vivid manner rendering the confusion of water and steam areas literally impossible at the receiving station, the liquid level being always indicated in a brilliant manner and the arrangement being such that in event of the failure of any element of the telegauge system, or other technical difficulty, a false-reading image cannot be presented at the receiving station.

This application is a continuation in part of joint application of James A. Good and Harry E. Brelsford, Serial No. 638,100, filed December 29, 1945, now abandoned.

Figure 2:
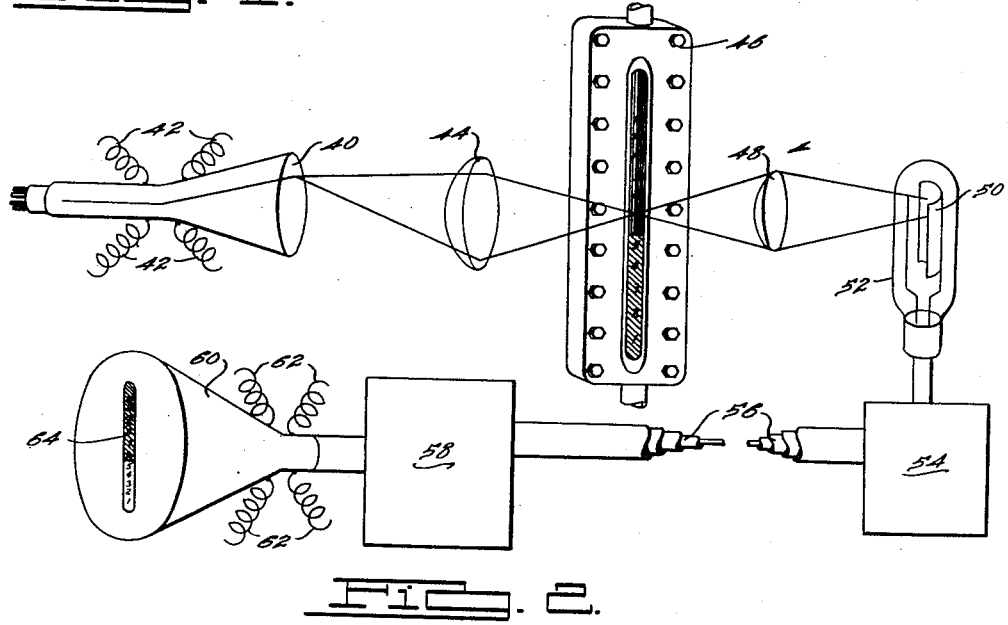
Figure 3:
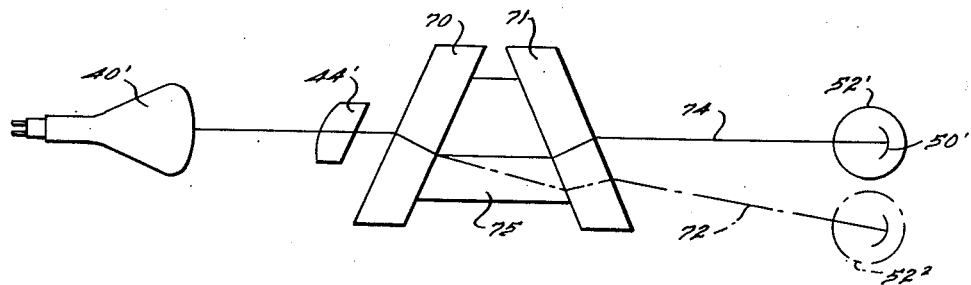

A preferred embodiment of the invention and illustrative modifications thereof are shown in the accompanying drawings in which:

Fig. 1 is a view, somewhat diagrammatic, of the preferred embodiment of the invention, Fig. 2 is a similar view of a modified form of the invention, and Fig. 3 is a diagrammatic view showing another modified form.

In the operation of steam boilers it is important that the boiler operator be able to see the water level, in order to know that the boiler is in proper operating condition. As boilers have increased in size, and the complexity of power stations has increased, it is becoming increasingly difficult for the operator to observe the water level as heretofore.

In the early development of steam boilers, round gauge glasses were used, which were easily in view from the operating level in front of the boiler, and then as pressures increased and boiler sizes also increased, resort was had to the use of gauges constructed of flat glasses protected by mica on the water faces in order to increase the safety factor, and also in order to increase the life of the glasses. These were illuminated so as to make the surface of the water stand out in an intensely bright manner, but in doing this the general illumination of the vision slot of the gauge became insufficient as the gauge elevation increased, so that it became very difficult for an operator to tell exactly where the water level was with respect to the end limits of vision on the gauge.

With the increasing size and capactiy of steam boilers, it has become increasingly difficult for the attendant to observe the water levels within the gauges. While it is true that by illuminating the gauges the meniscus gives off a brilliant light, nevertheless where the water level is raised so that the meniscus is beyond the limits of vision of the gauge, then there is no brilliant point at the separation of the water and steam which is observable by the operator. Likewise, if the water level is unusually low then there is no meniscus observable in the tube and under such conditions operators have mistaken such steam filled tube for a water filled tube with disastrous results for the boiler.

In the modern development of high pressure steam boilers it has become increasingly important to have a water level gauge of such construction that the operator or attendant cannot be given a false reading as to the water level and with the use of which there is a minimum chance of the gauge being misread by the operator or attendant.

An extremely valuable advancement in the art was made by the invention of the bi-color water gauge disclosed in Blackburn Patents No. 2,024,815 and 2,115,899 wherein advantage is taken of the different refractive indices of steam and water, light from differently colored sources as red and green being directed through a specially formed prismatic gauge tube assembly in such manner that portions of the gauge tube occupied by steam show red color to the observer, and portions of the gauge tube occupied by water show a green color to the observer.

This type of gauge made it possible to detect instantly whether the gauge glass was full or empty, due to the complete reversal of colors. Obviously, with such an arrangement, if the water is extremely low, then the entire gauge column shows red and the operator will never make the mistake of thinking that it is full of water. Conversely, if the water level in the boiler is extremely high the entire gauge column will show green.

Because of this effect it was possible to view this gauge from a very much greater distance than any preceding one, by the use of mirrors, which conducted the path of observation around obstacles. Frequently, it is necessary to use several mirrors, each one of which absorbs several percent of the light intensity, so that the resulting image in the last mirror under observation of the boiler operator is less intense.

In many modern installations of high efficiency boilers today the location of the boiler gauges are sometimes two hundred feet away from the control operator or engineer and inasmuch as many of these boilers would go dangerously dry in a matter of relatively few seconds if the water supply were curtailed or cut off, it is necessary to employ additional personnel solely for the purpose of observing the water level gauges and either controlling the water supply directly or communicating the condition of the water level to the operating engineer. This, of course increases the operating cost of the installation to a considerable extent, and introduces added human factors.

Various remote indicating devices have been placed on the market which are supposed to indicate the water level by various means, such as by the use of so-called constant head reservoirs, but these devices are subject to errors which make them less dependable than the circumstances require. False readings from such devices have proven to be disastrous in some instances.

It is a fundamental of both law and management that the operator have direct vision of the water itself without the intermediary of devices which may give false indication. Where the water gauge is at such a great distance that this cannot be done with the unaided eye, and even optical transmission by means of mirrors or the like is not satisfacory, I have found that an image of a liquid column gauge can be transmitted electrically by television. Using ordinary gauge glasses, however, the image at the receiving station is not adequate to enable the observer to distinguish between water and steam, so that a column full of steam might be mistaken for one full of water.

Even with the bi-color gauge of the Blackburn type having a brilliantly illuminated red area designating the steam-containing portions of the column while the water-containing portions of the column are illuminated with green light, rendering the two sections of the gauge readily distinguishable by direct observation, I have found that ordinary television apparatus will not present an image at the receiving station which permits distinguishing the red and green sections from one another.

In the construction shown in Fig. 1 of the drawings, a high pressure water level gauge of the bi-color Blackburn type is shown more or less diagrammatically, generally designated 4, together with television means which will produce an image of such character that steam and water containing portions of the gauge tube are readily distinguishable. The gauge tube assembly is provided with a source of light 6, the rays of which pass through green and red transparent or translucent panels 8 and 10, respectively, thence through a prism 12 so that the upper portion 14 of the water column, or the part which does not contain water, shows red, and the lower or water-containing portion 16 shows green. Reference may be had to Blackburn Patent No. 2,024,815 with regard to the details of operation of this type of gauge, since such details do not form a part of my present invention.

It is to be understood, however, that these panels 8 and 10 may be of other contrasting colors, or one only may be colored while the other is "white" light. In the claims, the term "contrasting color" is meant to include all of the foregoing, i. e., two colors or one color and one "white" light.

The gauge assembly 4 comprises glass and metal parts which define an elongated hollow member adapted to be attached to a steam boiler and have communication therewith, so that the normal water level is between the upper and lower end limits of the windows through which the water or other liquid is observable. This image is gathered through a lens 18 so as to be focused upon the photocathode 20 of a television camera tube generally designed 22 and form an electronic image thereon. The tube 22 is of the type employing instantaneous electronic scanning, as distinguished from storage scanning. Although the term "instantaneous scanning" is used herein, and elsewhere in the literature, to describe photo-responsive signal-generating tubes of this general class, it will be understood that it might be more precise to describe this class of tube as one wherein each increment of the light representing the photosignal is translated into an electrical signal instantaneously, that is, as rapidly as the electrons can be accelerated and without the time lag which occurs between the passes of the scanning beam in a tube of the storage-type. A tube which I have used successfully for this purpose is the type known as the image dissector, which has unusually good response characteristics as to color variations. Camera tubes of the commonly used iconoscope types, however, employing storage electronic scanning, I have found unsatisfactory. They will not distinguish between the differently colored portions of the bi-colored column adequately and so do not produce at the receiving station an image which is useful in the particular respect here under consideration.

In the storage-type camera tubes such as the iconoscope (and variations thereof), although the cathode sensitizing material may be the same as is used in the image dissector and other instantaneous types of phototubes (e. g. caesium oxide silver), the sensitizing material of storage tubes is in the form of a plurality of minute cells which are isolated and insulated from one another, whereas in the instantaneous-type of tube, the cathode surface is continuous. In the storage-type tube, each cell of the cathode continues to ionize under the influence of the image light during the time interval between passes of the scanning beam. The cells are swept in predetermined sequence by the scanning beam and when the beam returns to any given cell, electrons representing a signal impulse are freed from that cell by the beam, and the signal generated by such discharge corresponds to the degree of ionization built up during such scanning (storage) interval. A tube of this type may properly be considered as a "storage" tube because of the actual storage of electrons which occurs in the time interval between passes of the scanning beam. On the other hand, a camera tube of the instantaneous-type, such as an image dissector or a simple photocell, incorporates no mechanism whereby such a storage action can occur, and each increment of light which impinges upon the cathode immediately ionizes the cathode-sensitizing material in proportion to the intensity of illumination, and the signal thereby generated is instantaneously available at the cathode lead. In this discussion, as is generally the case in considering the action of these tubes, the infinitesimal time required to accelerate an electron is ignored.

The camera tube 22 is connected to an amplifier 24 and synchronizer 26 in the usual manner and the combined signal output passes through a shielded cable 28 to a receiving amplifier 30 and receiving synchronizer 32 in a well understood manner. The units 30 and 32 are connected to a television picture tube such as a cathode ray tube generally designed 34. The tube 34 is arranged to integrate the successively transmitted, varying, electronic signals to form an image 36 of the water level gauge 4 on the luminescent screen on the inner surface of the tube end. The water column 14 which is illuminated by light from source 6, is so depicted that the red and green portions are clearly distinguished on the viewing tube 36. Since a camera tube of the indicated type when used in the indicated combination responds much more strongly to red than to green, the picture tube fluoresces strongly in response to the portion of the gauge tube which shows red to direct view, while the picture tube is virtually unilluminated in its portion which shows the water-containing part of the Blackburn gauge tube, which appears green to direct view. The illuminated, steam-representing part of the picture tube is hatched for green in the drawing to represent a picture tube which fluoresces green although this is of course subject to variation.

In Fig. 2 of the drawings, I have shown another embodiment of the invention which I have successfully employed. Again it will be noted that instantaneous electronic scanning is used. It may be noted also that although this method of scanning has not been regarded as commercially practical, I have found it to be highly practical and certainly commercially useful when employed in the manner herein disclosed. A cathode ray tube 40 of the Braun oscillograph type but which has a screen of very low persistence, such as the so-called "flying spot" tube, forms the light source and is provided with horizontal and vertical scanning coils 42. The beam of light from tube 40 is directed through a focusing lens 44 so as to pass through registering windows at opposite sides of the Blackburn bi-color liquid level gauge assembly 46. The colored screens of the Blackburn gauge are not shown in this view, but red and green screens are preferably used so that the water gauge tube shows red and/or green to direct view in the usual manner. The gauge 46 is of course also adapted to be attached to a steam boiler or other liquid containing structure and have communication therewith, so that the normal water level in the gauge is between the upper and lower end limits of the windows through which the liquid level is observable. A lens 48 then directs the beam on the light sensitive plate 50 of a photo electric tube 52 which translates the image of the water level gauge into successive, varying electric signals.

The tube 52 is connected to an amplifier and synchronizer 54, to which the coils 42 are also connected in the usual manner. The synchronizing and image signals are transmitted through a shielded coaxial cable 56 to a remote location and received by an amplifying and synchronizing unit 58. The unit 58 is connected to a television picture tube such as a cathode ray tube 60 having horizontal and vertical scanning coils 62 in the usual manner. The tube 60 integrates the successively transmitted varying, electronic signals into an image 64 of the light transmitting portion of the water column of the liquid level gauge 46 on the luminescent screen on the inner surface of the tube end. The cathode sensitizing material used in the photo tube 52 must have good color response characteristics, on the order of those of the image dissecting tube of the first described embodiment, so that the two colored portions of the water column image focused thereupon may be rendered in a readily distinguishable manner at the receiver.

If desired the arrangement may be such that the image at the receiver consists of an illuminated area corresponding to the water-containing portions of the sight glass assembly at the gauge tube only, while the steam-containing portions remain dark, or a reverse representation may be presented in which the steam-containing portions are illuminated and the water-containing portions remain dark. The colored screens may be eliminated when this is done. In the embodiment of Figure 1, this result may be achieved by substituting an opaque screen for one only of the screens 8, 10, while a simple ground glass or other diffusing glass is substituted for the other screen. Thus the light which would be refracted toward the camera tube cathode by the water-containing portion of the sight glass assembly, or by the steam containing portion, as the case may be, is blocked by the opaque screen, as a result of which only the other portion of the water column is illuminated and only the image of the latter portion is impressed upon the camera tube for transmission to the receiving station.

It is also possible to rearrange the system of Figure 2 so that at the receiving station the gauge representation on the picture tube shows only the water-containing portion of the gauge tube assembly or only the steam-containing portion. A diagrammatic representation as to how this may be effected is given in Figure 3. In this embodiment of the invention the use of colored screens may be eliminated. The scanning-light source designated 40' may comprise a flying spot tube as before, from which the light is directed to the Blackburn type level indicating gauge, which does not, however, incorporate the colored screens. The light enters gauge window 70 through the elongated lens assembly 44'. The angular disposition of the windows 70, 71, is such that light directed through that portion of the sight glass assembly which contains water is refracted laterally by the column assembly and may emerge, for example, in a path such as that indicated by the broken line 72. Light directed through that portion of the sight glass assembly which contains only steam, however, passes through and from the column in a path more nearly straight, such as that indicated by the solid line 74, and such light may strike the photo-sensitive cathode 50' of photo-tube 52'. Photo-tube 52' may serve as the camera tube of a television system corresponding to that diagrammatically shown in Figure 2, so that with appropriate synchronizing and video signal generating and transmitting means, a picture may be formed upon the picture tube at the receiving station which will show only that portion of the column above the liquid level therein.

It will be evident that by moving the phototube to a position in which it is capable of intercepting the beam 72 but not the beam 74, the illuminated region may be reversed at the receiving station, where the image will then show the length of the water-containing portion of the gauge tube, the steam-containing portion being represented by an unilluminated area.

Although the field of view of the Blackburn type gauge is very narrow to direct observation, being in fact limited to approximately 3°, the image on the picture tube of my improved telegauge is viewable throughout a very wide angle, of the order of 150°. It will be recognized that this adds very substantially to the convenience of the gauge and to the safety its presence affords, since as a practical matter the operator cannot be expected to remain directly in front of the image and he will form the habit of looking at it more often when it is not necessary that he be directly in front of it in order to see it.

It will also be apparent that other variations and modifications may be made without departing from the fair meaning and intended scope of the appended claim.

I claim:

A boiler water level telegauge comprising a translucent water gauge tube adapted to be connected in communication with a steam boiler so that a level of liquid lies in the translucent tube to denote the water level in the boiler, a light source and light refracting means arranged in substantial alignment with one another and with said translucent tube to project light through the tube so that, due to the different indices of refraction of water and steam, the water-containing portions of the tube transmit only light which is substantially confined to the green region of the spectrum, and the portions of the tube above the water level therein transmit only light and radiant energy lying in the general region of the red end of the spectrum, an electronic camera tube of the image dissector type having a cathode arranged to intercept such light and radiant energy transmitted through portions of the gauge tube both above and below the liquid level, said camera tube being of the instantaneous photosignal translating type, monochromatic television transmitting means connected to said camera tube and incorporating an amplifier of the substantially linear type, and monochromatic television receiving means responsive to signals generated by said transmitting means.

JAMES A. GOOD.

REFERENCES CITED

The following references are of record in the file of this patent:

UNITED STATES PATENTS

| Number | Name | Date |
| --- | --- | --- |
| 1,660,886 | Randall | Feb. 28, 1928 |
| 1,691,324 | Zworykin | Nov. 13, 1928 |
| 2,204,815 | Blackburn | Dec. 17, 1935 |
| 2,389,979 | Huffnagle | Nov. 27, 1945 |